United States Patent
Sanders et al.

(10) Patent No.: US 9,663,701 B2
(45) Date of Patent: May 30, 2017

(54) METHOD FOR REDUCING PERMEABILITY OF A SUBTERRANEAN RESERVOIR

(75) Inventors: Mark Sanders, Aberdeenshire (GB); Russell Watson, Stavanger (NO)

(73) Assignees: M-I Drilling Fluids U.K. Ltd., Aberdeen (GB); Schlumberger Norge, AS, Hafrsfjord (NO)

( * ) Notice: Subject to any disclaimer, the term of this patent is extended or adjusted under 35 U.S.C. 154(b) by 468 days.

(21) Appl. No.: 13/982,226

(22) PCT Filed: Jan. 27, 2012

(86) PCT No.: PCT/GB2012/050180
§ 371 (c)(1),
(2), (4) Date: Oct. 14, 2013

(87) PCT Pub. No.: WO2012/101456
PCT Pub. Date: Aug. 2, 2012

(65) Prior Publication Data
US 2014/0041870 A1   Feb. 13, 2014

Related U.S. Application Data

(60) Provisional application No. 61/436,854, filed on Jan. 27, 2011.

(30) Foreign Application Priority Data

Jun. 6, 2011  (GB) .................................. 1109446.3

(51) Int. Cl.
*E21B 33/138*  (2006.01)
*C09K 8/42*  (2006.01)
(Continued)

(52) U.S. Cl.
CPC .............. *C09K 8/426* (2013.01); *C09K 8/502* (2013.01); *C09K 8/516* (2013.01); *E21B 33/138* (2013.01); *C09K 2208/18* (2013.01)

(58) Field of Classification Search
CPC ............................. E21B 33/138; C09K 8/426
See application file for complete search history.

(56) References Cited

U.S. PATENT DOCUMENTS

| | | | |
|---|---|---|---|
| 3,979,304 A | 9/1976 | Fischer et al. | |
| 4,192,753 A * | 3/1980 | Pye .......................... | C09K 8/24 166/283 |

(Continued)

FOREIGN PATENT DOCUMENTS

| | | | |
|---|---|---|---|
| EP | 0878604 A2 | 11/1998 | |
| EP | 2055683 A1 | 5/2009 | |

OTHER PUBLICATIONS

International Search Report for PCT Application Serial Na PCT/GB2012/050180 dated May 31, 2012.

(Continued)

*Primary Examiner* — Angela M DiTrani
*Assistant Examiner* — Andrew H Sue-Ako
(74) *Attorney, Agent, or Firm* — Sara M. Hinkley

(57) ABSTRACT

The present invention provides a method of isolating a selected reservoir zone in a subterranean reservoir comprising at least the step of squeezing a treatment fluid into the selected reservoir zone, the treatment fluid comprising: a viscosifying agent; a fluid loss control agent; and a particulate material. The invention further provides a treatment fluid comprising a base fluid; a viscosifying agent; at least 20 kg/m$^3$ of a fluid loss control agent; and a particulate material.

16 Claims, 1 Drawing Sheet

Figure 1:
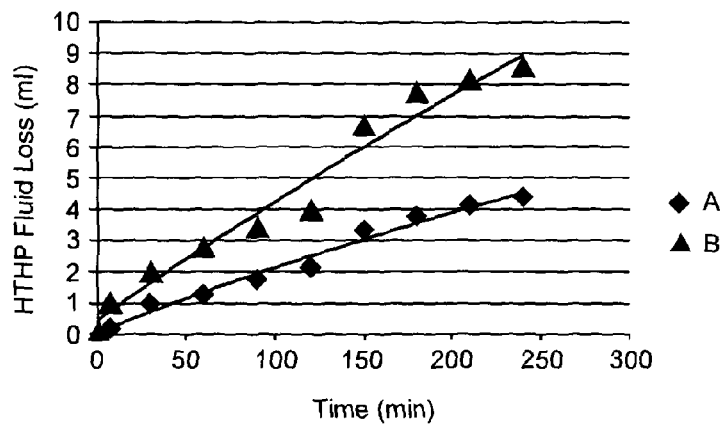

(51) Int. Cl.
*C09K 8/502* (2006.01)
*C09K 8/516* (2006.01)

(56) References Cited

U.S. PATENT DOCUMENTS

| | | | | |
|---|---|---|---|---|
| 4,947,935 A | * | 8/1990 | Sydansk | C09K 8/035 |
| | | | | 166/268 |
| 5,861,362 A | * | 1/1999 | Mayeux | C09K 8/035 |
| | | | | 175/72 |
| 2005/0059556 A1 | | 3/2005 | Munoz, Jr. et al. | |
| 2007/0213233 A1 | * | 9/2007 | Freeman | C09K 8/12 |
| | | | | 507/261 |
| 2007/0287637 A1 | | 12/2007 | Bradbury et al. | |
| 2008/0248978 A1 | | 10/2008 | Huang et al. | |
| 2009/0008095 A1 | * | 1/2009 | Duncum | C09K 8/032 |
| | | | | 166/292 |
| 2009/0038801 A1 | * | 2/2009 | Ravi | C04B 28/02 |
| | | | | 166/293 |
| 2009/0124521 A1 | * | 5/2009 | Bradbury | C09K 3/00 |
| | | | | 507/219 |
| 2009/0221452 A1 | * | 9/2009 | Whitfill | C09K 8/03 |
| | | | | 507/104 |

OTHER PUBLICATIONS

International Preliminary Report on Patentability for PCT Application Serial No. PCT/GB2012/050180 dated Jul. 30, 2013, 10 pages.
Chang, et al., "Recommended Practice for Overbalanced Perforating in Long Horizontal Wells", SPE 94596, prepared for presentation at the SPE European Formation Damage Conference held in Scheveningen, The Netherlands, May 25-27, 2005, pp. 1-12.
Jiang, et al., "New Low-Solids OBM Demonstrates Improved Returns as Perforating Kill Pill", SPE 73709, prepared for presentation at the SPE International Symposium and Exhibition on Formation Damage Control in Lafayette, Louisiana, Feb. 20-21, 2002, pp. 1-11.

* cited by examiner

METHOD FOR REDUCING PERMEABILITY OF A SUBTERRANEAN RESERVOIR

The present disclosure relates to a method and composition for reducing the permeability of subterranean reservoirs.

Permanently isolating one or more producing zones from another is occasionally required as a means of maximizing net flow from a producing well. Zonal isolation may be required to minimize the crossflow to a lower-pressured (often depleted) zone from a higher-pressured zone targeted for future production.

Historically, cement and mechanical barriers have been utilized to achieve zonal isolation. However, both methods require large costs in time, rig space, and money. Accordingly, there is a continued need to provide economical zonal isolation.

According to a first aspect of the present disclosure there is provided a method for reducing the permeability of a subterranean reservoir, comprising at least the step of squeezing a treatment fluid into a selected reservoir zone of the subterranean reservoir, the treatment fluid comprising: a viscosifying agent; a fluid loss control agent; and a particulate material.

The method is also applicable to permeable formation zones where a degree of zonal isolation is required. References to "reservoir zone" hereinafter can also include said permeable formation zones. Thus, a subterranean reservoir may comprise a plurality of reservoir zones including the selected reservoir zone. A reservoir zone may be a permeable formation zone. The plurality of reservoir zones may be under different conditions, for instance different pressures and/or temperatures. The plurality of reservoir zones may be in fluid communication prior to the application of the treatment fluid.

Squeezing is the application of pressure to force a treatment fluid or slurry into a selected reservoir zone, for instance by pumping. Generally, squeezing is conducted at a downhole injection pressure above the selected reservoir zone pressure, optionally at least 50 psi (345 kPa) more than the selected reservoir zone pressure, optionally at least 100 psi (689 kPa) more than the selected reservoir zone pressure. Optionally, squeezing is conducted at a downhole injection pressure up to 4000 psi (27,579 kPa) more than the selected reservoir zone pressure. Optionally, squeezing is conducted at a pressure of 4500 psi (31,026 kPa) overbalance. Overbalance in this context means the pressure in the wellbore in excess of the pressure of fluid in the formation zone.

Preferably the squeeze is performed at a downhole injection pressure below that of the reservoir zone fracture pressure.

Treatment fluid flows into pores in the selected reservoir zone and seals them in part at least. Thus the step of squeezing may include emplacing the treatment fluid into the selected reservoir zone of the subterranean reservoir. Squeezing in this context is used to describe the injection of the treatment fluid into the selected reservoir zone. The treatment fluid may be injected for pressure-isolation purposes. The treatment fluid may be injected into the selected reservoir zone under pressure.

The method may further comprise the step of squeezing the treatment fluid into perforations in the selected reservoir zone and allowing the treatment fluid to seal the perforations. The perforations may be perforations previously made in a casing, or a slotted screen for example. This can essentially damage a formation (or formation zone) in the reservoir zone, that is, inhibit flow of fluid in the formation zone, contrary to normal practice.

The treatment fluid may damage at least a portion of the subterranean reservoir. The treatment fluid may severely curtail, if not provide a permanent barrier to, two-way flow between a subterranean reservoir and a borehole and/or the selected reservoir zone and the rest of the subterranean reservoir.

The provision of a permanent barrier can mean that the treatment fluid remains in the selected reservoir zone. In the present context, the term 'permanent' can mean that the barrier provided by the treatment fluid remains effective for more than one month i.e. more than 30 days, optionally more than one year i.e. more than 365 days. The effectiveness of the barrier may depend on one or more of the permeability of the selected reservoir zone of the subterranean reservoir, the pressure of the selected reservoir zone pressure and the solvency of the hydrocarbons being produced from the subterranean reservoir.

The treatment fluid may damage at least a portion of the subterranean reservoir such that the permeability of at least a portion of the subterranean reservoir is reduced to less than 0.2 millidarcies, optionally less than 0.1 millidarcies, and may be less than 0.02 millidarcies.

The step of squeezing may be performed after production has occurred from the selected reservoir zone. Thus, the selected reservoir zone is often lined either with casing (having perforations) or with a sand screen (having holes). The step of squeezing may thus at least partially seal the perforations or the holes, as well as, or instead of, pores of the formation or formation zone.

The method may include the step of isolating a higher pressure reservoir zone, for example by deploying a temporary plug to isolate the higher pressure reservoir zone from a lower pressure reservoir zone. The method may also include the step of treating the selected reservoir zone with the treatment fluid described herein and then removing the temporary plug.

The definitions set forth in Gray and Darley (Composition and Properties of Drilling and Completion Fluids, 5th edition, Gulf Publishing Company, 1988) for various terms will be used herein. Thus bitumen or bituminous materials include asphalt, asphaltites and mineral waxes. Asphalt and asphaltic compounds are generally produced as a residue from petroleum refining and are largely made up from asphaltenes and oils which may contain waxes. Asphaltites by contrast are naturally occurring solid bitumens and one example is GILSONITE™ (American Gilsonite Company, Utah). GILSONITE™ is a form of natural asphalt mined from the Uintah Basin of Utah. The mineral name for GILSONITE™ is uintaite or uintahite.

The viscosifying agent may comprise an organophilic clay selected from at least one of the group comprising, typically consisting of, bentonite, montmorillonite, hectorite, attapulgite, illite, fullers earth, beidillite, saponite, vermiculite, zeolites, and combinations thereof.

The fluid loss control agent may have a softening point of at least 250° F. (121° C.), optionally at least 270° F. (132° C.).

The fluid loss control agent may be selected from the group consisting of modified lignites, asphaltic compounds, asphaltites especially GILSONITE™, organophilic humates (which may be prepared by reacting humic acid with amides or polyalkylene polyamides), and combinations thereof. More preferably, the fluid loss control agent is at least one of air-blown asphalt and sodium sulfonate asphalt.

The treatment fluid may comprise a plurality of fluid loss control agents. The plurality of fluid loss control agents may be selected from two or more of the group consisting of modified lignites, asphaltic compounds, asphaltites especially GILSONITE™ and organophilic humates (which may be prepared by reacting humic acid with amides or polyalkylene polyamides).

The particulate material may comprise, typically consist of, at least one or more of calcium carbonate, dolomite, siderite, barite, ultra fine barite, celestite, iron oxides, manganese oxides, ulexite, carnalite, and sodium chloride.

The particulate material may have a d50 (mass median diameter) of less than 30 microns, may be less than 20 microns, optionally less than 10 microns, optionally less than 5 microns.

The particulate material may further have a particle size distribution of less than one half, preferably less than one-third of the average pore size of a reservoir matrix of the selected reservoir zone. "Reservoir matrix" in this context means the pore matrix or network of pores and/or channels in the selected reservoir zone in the subterranean reservoir.

The treatment fluid may further comprise an oleaginous fluid. The oleaginous fluid may be emulsified with an aqueous fluid.

The treatment fluid may further comprise at least one or more of lime ($CaOH_2$) and quicklime (CaO).

It is an advantage that the treatment fluid comprising a viscosifying agent, a fluid loss control agent and particulate material can if necessary readily be mixed onsite and therefore at or near to the point of use. It is also an advantage that the components of the treatment fluid disclosed herein can be pumped downhole using conventional and readily available pumping equipment. This can mean that existing pipe in a borehole can remain in place while the treatment fluid is pumped downhole, rather than the existing pipe needing to be removed and/or modified so that cement can be safely pumped downhole.

For the avoidance of doubt, the optional and/or preferred features of the further aspects of the present disclosure discussed below can be incorporated into the treatment fluid of the first aspect. Similarly, the optional and/or preferred features of the first aspect of the present disclosure can be incorporated into the further aspects discussed below.

According to a second aspect of the present disclosure there is provided a method of isolating a selected reservoir zone in a subterranean reservoir, comprising at least the step of squeezing a treatment fluid into the selected reservoir zone, the treatment fluid comprising: a viscosifying agent; a fluid loss control agent; and a particulate material.

The selected reservoir zone may have produced hydrocarbons for a period of time before the step of squeezing the treatment fluid into the selected reservoir zone is performed. Preferably, the selected reservoir zone has produced hydrocarbons for a period of time of at least one day, before the step of squeezing the treatment fluid into the selected reservoir zone is performed.

The method may further comprise the step of perforating a formation or formation zone prior to the step of squeezing the treatment fluid into the selected reservoir zone of the subterranean reservoir.

The method may further comprise the step of perforating a reservoir zone prior to the step of squeezing the treatment fluid into the selected reservoir zone of the subterranean reservoir. The reservoir zone which is perforated may be the selected reservoir zone or a different reservoir zone. As used herein, the term 'different reservoir zone' is intended to mean a zone of a subterranean reservoir other than the selected reservoir zone.

The method may further comprise the step of producing from a separate reservoir zone after the step of squeezing a treatment fluid into the selected reservoir zone and the selected reservoir zone has been sealed. As used herein, the term 'separate reservoir zone' is intended to mean a zone of a subterranean reservoir other than the selected reservoir zone. The squeezing treatment can isolate, particularly in terms of the communication of fluids, the selected reservoir zone from other zones in the subterranean reservoir to provide separate zones which can then be subsequently used to produce hydrocarbons.

The treatment fluid may further comprise a micronized particulate. The step of squeezing may include squeezing the treatment fluid into perforations in the selected reservoir zone, and allowing the treatment fluid to seal the perforations.

The viscosifying agent may comprise an organophilic clay. The organophilic clay may be selected from at least one of the group comprising, typically consisting of, bentonite, montmorillonite, hectorite, attapulgite, illite, fullers earth, beidillite, saponite, vermiculite, zeolites, and combinations thereof.

The fluid loss control agent may have a softening point of at least 250° F. (121° C.), optionally at least 270° F. (132° C.).

The fluid loss control agent may be selected from the group consisting of modified lignites, asphaltic compounds, asphaltites, especially GILSONITE™, organophilic humates (e.g. prepared by reacting humic acid with amides or polyalkylene polyamides), and combinations thereof.

The treatment fluid may have at least 20 kg/m$^3$ of fluid loss control agent (preferably GILSONITE™), optionally at least 25 kg/m$^3$, more optionally at least 30 kg/m$^3$, and sometimes more than 35 kg/m$^3$.

The particulate material may comprise, typically consist of, at least one or more of calcium carbonate, dolomite, siderite, barite, ultra fine barite, celestite, iron oxides, manganese oxides, ulexite, carnalite, and sodium chloride.

The particulate material may have a d50 mass median diameter of less than 30 microns, may be less than 20 microns, optionally less than 10 microns, optionally less than 5 microns.

The particulate material may further have a particle size distribution less than one-third of the average pore size of a reservoir matrix.

The treatment fluid may further comprise an oleaginous fluid. The oleaginous fluid may be emulsified with an aqueous fluid.

The preferred and/or optional features of the other aspects of the present disclosure can be incorporated into the second aspect of the present disclosure and vice versa.

According to a third aspect of the present disclosure, the treatment fluid herein described may be used to reduce the permeability of a porous reservoir matrix. The treatment fluid may comprise a base fluid, a viscosifying agent, a fluid loss control agent, and a particulate material.

The particulate material may have a particle size distribution of less than one-half, optionally less than one-third the average pore size of the reservoir matrix.

To determine the average pore size of the reservoir matrix, analysis of geological thin sections (such as 35 μm thick slices of resonated formation rock) can be conducted. The rock section can be examined under a petrographic microscope and a number of random pore sizes, for instance a minimum of 200 random (using a grid selection) pore sizes, can be measured and the d50 percentile calculated.

The sizing of the particulate material according to the aspects of the present disclosure is very different from the sizing of particles of drilling fluid. Indeed, the sizes used herein would not be considered for drilling fluids because they would only cause unwanted drilling fluid loss and damage the formation by invading the reservoir and inhibiting fluid flow through the formation.

During drilling, the distinct process of creating a filter cake on a formation can be used to inhibit flow of particles into the formation, and so produce a temporary external block to inhibit drilling fluid loss. In contradistinction, for embodiments of the present disclosure, it is an object is to allow the treatment fluid to enter the formation to seal the formation. Thus for certain embodiments of the present disclosure, depending on the pore size of the reservoir matrix for which they are intended for use, the particle size distribution of particulate material may have a d90 of between 4 and 40 microns.

The preferred and/or optional features of the other aspects of the present disclosure can be incorporated into the third aspect of the present disclosure and vice versa.

According to a fourth aspect of the present disclosure there is provided a treatment fluid comprising: a base fluid; a viscosifying agent; at least 20 kg/m$^3$ of a fluid loss control agent; and a particulate material.

A lower pressure, often depleted, reservoir zone may be a high temperature zone that has a reservoir temperature of at least that of the softening point of the fluid loss control agent, such as at least 250° F. (121° C.). Production from a higher pressure reservoir zone may be lost into the lower pressure zone in fluid connection with the higher pressure zone unless the lower pressure zone is isolated. The lower pressure zone may or may not be perforated and may or may not comprise, and optionally be, a sand section, such as a sand perforation. Any isolation treatment applied to the lower pressure zone and/or sand perforations should preferably withstand not only the typically high temperatures involved, but also differential pressures in the region of 300 bar (30,000 kPa).

The preferred and/or optional features of the other aspects of the present disclosure can be incorporated into the fourth aspect of the present disclosure and vice versa.

According to a fifth aspect of the present disclosure there is provided a treatment fluid for reducing permeability in a porous zone of a reservoir.

The reduced permeability may be used to isolate a selected reservoir zone of a subterranean reservoir, either by completely sealing pores in the selected formation zone, or at least partially reducing the permeability of the selected formation zone. Through zonal isolation, limiting reservoir cross-flow under conditions of high temperature and high differential pressure may be achieved.

The treatment fluid may comprise a base fluid; a viscosifying agent; at least 20 kg/m$^3$ of a fluid loss control agent; and a particulate material.

The treatment fluid may include specially sized and selected particles designed to invade a porous reservoir matrix. The treatment fluid may include a temperature triggered bonding agent. The treatment fluid may include ingredients or components that ensure the treatment fluid reaches the target of the porous reservoir matrix. For instance, the combination of components of the treatment fluid can create a well defined seal within the matrix and/or a perforation tunnel.

While many viscosifying agents are known to those skilled in the art, the viscosifying agent used is preferably an organophilic clay. Organophilic clays are preferably amine treated clays, especially aliphatic clays reacted with aliphatic amine salts and with quaternary ammonium salts or bases.

The viscosifying agent may comprise an organophilic clay selected from at least one the group comprising, typically consisting of, bentonite, montmorillonite, hectorite, attapulgite, illite, fullers earth, beidillite, saponite, vermiculite, zeolites, and combinations thereof. Exemplary viscosifying agents include TRUVIS® and VERSAGEL® HT, both commercially available from M-I SWACO (Houston, Tex.).

The concentration of organophilic clay by weight in the treatment fluid should be sufficient to achieve the desired rheological properties of the treatment fluid, and so the concentration by weight of the viscosifying agent in the treatment fluid may be about 0.1% to about 20%, preferably, about 1% to about 10% by weight in the treatment fluid.

A plurality of viscosifying agents may be used, such as two viscosifying agents. The two viscosifying agents may be two organophilic clays, one for initial viscosity and one for maintaining the desired rheological properties under downhole conditions. For example an organo-treated bentonite clay (such as TRUVIS®, available from M-I SWACO) may be used for initial viscosity and an organo-treated hectorite clay (such as VERSAGEL HT®, available from M-I SWACO) may be used for maintaining the desired rheological properties under downhole conditions.

The fluid loss control agent may be selected from the group consisting of modified lignites, asphaltic compounds, asphaltites especially GILSONITE™, organophilic humates (e.g. prepared by reacting humic acid with amides or polyalkylene polyamides), and combinations thereof.

The fluid loss control agent may have a softening point above 250° F. (121° C.). One example of a fluid loss control agent with a softening point above 250° F. (121° C.) is VERSATROL® HT, commercially available from M-I SWACO.

The concentration by weight of the fluid loss control agent in the treatment fluid can be sufficient to reduce the fluid loss in a porous formation. Such concentrations by weight of the fluid loss control agent in the treatment fluid may be about 0.1% to about 20%, and preferably about 1% to about 10%.

At higher softening points, for example above 500° F. (260° C.), asphaltic materials are preferred for the fluid loss control agent, such as air-blown asphalt, or sodium sulfonate asphalt.

Viscosifying agents such as organophilic clay may help to control fluid loss.

In isolation, the viscosifying agent can divert the flow of produced fluids including hydrocarbons. In isolation, neither the fluid loss control agent nor the particulate material damages a subterranean reservoir but they can affect the permeability of a subterranean reservoir formation. Only the particular combination of viscosifying agent, fluid loss control agent and particulate material described herein provides the required damage to the subterranean reservoir formation to provide a barrier, preferably a permanent barrier, to two-way flow between the subterranean reservoir and a borehole.

The particulate material may have a particle size distribution with a d50 mass median diameter of less than 30 microns, may be less than 20 microns, optionally less than 10 microns, optionally less than 5 microns.

Compared to a reservoir matrix, the particulate material may have a particle size distribution of less than one-third of the average pore size of the reservoir matrix.

Various types of particulate material are available. The preferred particulate material of the present disclosure is at least one of the group consisting of calcium carbonate, dolomite, siderite, barite, ultra fine barite, celestite, iron oxides, manganese oxides, ulexite, carnalite, and sodium chloride. More preferably, the particulate material is selected from calcium carbonate, ultra fine barite, and combinations thereof.

The base fluid of the present disclosure may be an oil-based fluid. The oil-based fluid may be in the form of an invert-emulsion fluid, wherein the invert emulsion fluid consists of three phases: an oleaginous phase, an aqueous phase, and a finely divided particle phase.

The aqueous phase may be a discontinuous phase and may be dispersed in the oleaginous phase, that may be an external or continuous phase, with the aid of one or more emulsifiers. An invert emulsion is achieved using emulsifiers, which reduce the surface tension between the discontinuous aqueous phase and the continuous oleaginous phase. Emulsifiers stabilize the mixture by being partially soluble in the both the aqueous and oleaginous phases.

The oleaginous phase of the invert emulsion may be a liquid. The oleaginous phase may comprise one or more oleaginous fluids, such as a natural or synthetic oil, and still more preferably selected from the group including but not limited to diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof.

The concentration of the one or more oleaginous fluid should be sufficient such that an invert emulsion forms and so the concentration may be more than about 40% by volume of the emulsion and may be more than 60% by volume.

The aqueous phase of the invert emulsion may include at least one of fresh water, sea water, brine, mixtures of water and water soluble organic compounds, and mixtures thereof. For example, the aqueous fluid may be formulated with mixtures of desired salts in fresh water. Such salts may include, but are not limited to, alkali metal chlorides, hydroxides, and carboxylates, for example. In various embodiments of the treatment fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminium, magnesium, potassium, strontium, and lithium, salts of chlorides, bromides, carbonates, iodides, chlorates, bromates, formats, nitrates, oxides, phosphates, sulfates, silicates, and fluorides. Salts that may be incorporated in a given brine include any one or more of those present in natural seawater or any other organic or inorganic dissolved salts. Additionally, brines that may be used in the treatment fluids disclosed herein may be natural or synthetic, with synthetic brines tending to be much simpler in constitution. In one embodiment, the density of the treatment fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

Porous zone of the reservoir and/or other zones of the reservoir may be subject to a pre-flush and/or a post-flush particularly to mitigate hydrate formation. For example a blend of triethylene glycol (TEG) and water (such as a 70:30 blend) can be flushed into and through the porous zone of the reservoir and/or other zones of the reservoir before and/or after the squeeze treatment described herein.

The preferred and/or optional features of the other aspects of the present disclosure can be incorporated into the fifth aspect of the present disclosure and vice versa.

The method and treatment fluid described herein will now be discussed with respect to the following non-limiting drawings.

Figure 2:
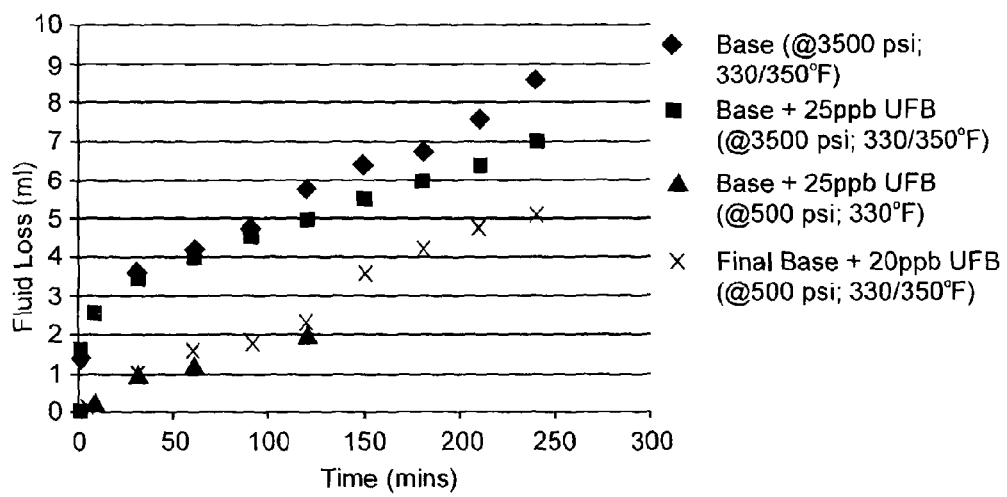

FIG. 1 shows a graphical representation of the fluid loss profile of a treatment fluid versus time; and FIG. 2 shows a graphical representation of the fluid loss profile for various concentrations of particulate material.

In one example due to the high temperatures and pressures involved in the zones of a subterranean reservoir, it was decided that the most cost effective means of isolating the upper sand section as a selected reservoir zone, was to bull-head and squeeze a discrete viscous pill into the perforation tunnels; the pill to be formulated to contain products that would deliberately, and permanently, damage the formation.

Specifically, these products would include a combination of natural bituminous materials, such as GILSONITE™, selected from within a defined softening point range, and a relatively fine blend of chosen particulates, such calcium carbonate (as marble) and barite. The particle size distribution of the particulates would be designed to produce a filtercake. The softening points of GILSONITE™ products vary from 270-370° F. (132-188° C.). This material may act as a binding agent for the added solids.

"Damage" in this context means the treatment fluid provides a severely curtailed, if not permanent, barrier to two-way flow between a selected reservoir zone and another zone in the subterranean reservoir. "Isolation" in this context means restricting fluid communication between the selected reservoir zone and the rest of the subterranean reservoir containing the selected zone. Thus, as discussed above, the treatment fluid may limit, if not provide a permanent barrier to, fluid flow between the selected reservoir zone and at least one other zone of the subterranean reservoir.

Broadly speaking, initial fluid characteristics called for a low spurt/low fluid-loss pill in order to promote efficient fill of the entire perforation length. If fluid loss rates were high, and too coarse a particulate used at too high a loading, there was a risk of premature bridging occurring during the perforation fill stage, resulting in a less efficient seal. However, it was realised that a higher spurt-loss, combined with a greater proportion of finer grain particulates in the blend, in fact fine enough to enter the formation pore spaces, would be beneficial in developing an improved internal barrier within the reservoir sand.

The following examples illustrate treatment fluids for reducing permeability of porous reservoir zones.

The formulations for Fluids A and B comprise an emulsified base fluid comprising oleaginous and aqueous phases; emulsifiers; organophilic clay; fluid loss control agent, lime, and particulate materials. As demonstrated in Table 1 below, Fluid A and Fluid B differ in the fluid loss control agent utilized, permitting evaluation of the preferred fluid loss control agent in high temperature conditions. TRUVIS® and VERSAGEL®HT, SUREMUL® EH, ULTIDRILL®, VERSATROL®, VERSATROL® M, VERSATROL® HT and SAFECARB® are all commercially available from M-I SWACO (Houston, Tex.). UFB is an ultra fine barium sulphate (barite), with a d50 mass median diameter of less than 10 microns, and more preferably a d50 of less than 5 microns. The rheology of Fluids A and B before and after heat rolling at 330° F. (166° C.) for 16 hours can be found in Table 2 below.

TABLE 1

Formulations for Fluids A and B

| Products | Fluid A Vol (mL) (1 barrel) | Fluid B Vol (mL) (4 barrels) |
|---|---|---|
| DF-1 Base oil | 191.316 | 765.263 |
| CaCl₂ liquor | 60.716 | 242.866 |
| Water | 37.820 | 151.280 |
| TRUVIS ® - a viscosifying agent comprising organophilic clay | 2.647 | 10.588 |
| SUREMUL ® EH A surfactant | 7.292 | 29.167 |
| ULTIDRILL ® FL A secondary emulsifier | 1.042 | 4.167 |
| VERSAGEL ® HT A viscosifying agent comprising organophilic clay | 4.118 | 16.471 |
| VERSATROL ® HT GILSONITE ™ - based fluid loss control agent | 12.381 | 49.524 |
| VERSATROL ® M GILSONITE ™ - based fluid loss control agent | 0.000 | 49.524 |
| VERSATROL ® GILSONITE ™ - based fluid loss control agent | 12.381 | 0.000 |
| Lime | 2.991 | 11.966 |
| SAFECARB ® 2 - Particulate material comprising a calcium carbonate bridging agent | 7.380 | 29.520 |
| SAFECARB ® 10 - Particulate material comprising a calcium carbonate bridging agent | 18.450 | 73.801 |
| UFG Barite - A weighting agent | 4.810 | 19.238 |

TABLE 2

Rheology of Fluids A and B before heat rolling and after heat rolling

| | Rheology | | | | | | Gels | | | | |
|---|---|---|---|---|---|---|---|---|---|---|---|
| | 600 | 300 | 200 | 100 | 6 | 3 | 10 s | 10 min | PV | YP | ES (V) |
| Fluid A Before Heat Rolling | 213 | 140 | 111 | 77 | 26 | 22 | 29 | 44 | 73 | 67 | 212 |
| Fluid A After Heat Rolling | 156 | 97 | 73 | 45 | 7 | 5 | 6 | 15 | 59 | 38 | 405 |
| Fluid B Before Heat Rolling | 174 | 114 | 90 | 62 | 22 | 19 | 24 | 31 | 60 | 54 | 308 |
| Fluid B After Heat Rolling | 142 | 85 | 63 | 37 | 4 | 2 | 4 | 9 | 57 | 28 | 330 |

Table 3 details fluid loss results after heat rolling at 330° F. (166° C.) for 16 hours, which are further demonstrated in FIG. 1. Notably, Fluid A provides reduced fluid loss over a longer period of time, reflecting that combining VERSATROL HT with VERSATROL provides better fluid loss control at high temperatures over time.

TABLE 3

Fluid Loss of Fluids A and B after Heat Rolling

| HTHP FI @ 330° F. (166° C.)/Aloxite disc 10 Micron/170-55 | Fluid A AHR at 330° F. (166° C.)/16 hours | Fluid B AHR at 330° F. (166° C.)/16 hours |
|---|---|---|
| 1 minutes | a trace | 0.1 |
| 7.5 minutes | 0.2 | 1 |
| 30 minutes | 1 | 2 |
| 1 hour | 1.3 | 2.8 |
| 1.5 hours | 1.8 | 3.4 |
| 2 hours | 2.2 | 4 |
| 2.5 hours @ 350° F. (177° C.) | 3.4 | 6.7 |
| 3 hours | 3.8 | 7.8 |
| 3.5 hours | 4.2 | 8.2 |
| 4 hours | 4.4 | 8.6 |
| Filter cake | | |
| SG | 1.152 | 1.15 |
| Disc Lot # | 170-55 | 170-55 |

A separate test was run, varying the concentration of particulate materials with the base formulation found in Table 4 below, with the rheology of the fluid with 20 pounds per barrel of ultra fine barite (UFB) presented in Table 5. As detailed in FIG. 2, an increase in concentration of ultra fine barite provides better high temperature fluid loss control over time than the fluid without any ultra fine barite.

TABLE 4

Fluid C Formulation

| Component | Concentration |
|---|---|
| DF-1 Base Oil | 0.55 bbls |
| SUREMUL ® EH | 7 ppb |
| ULTIDRILL FL | 1 ppb |
| TRUVIS ® | 4.5 ppb |
| VERSAGEL ® HT | 7 ppb |
| VERSATROL ® HT | 13 ppb |
| Lime | 7 ppb |
| Freshwater | 0.108 bbls |
| CaCl₂ Brine (at 11.3 ppg) | 0.173 bbls |
| SAFECARB ® 2 | 20 ppb |
| SAFECARB ® 10 | 50 ppb |

TABLE 5

Rheology of Fluid C at 330° F. (166° C.) after Heat Rolling for 16 Hours

| | |
|---|---|
| 600 rpm | 153 |
| 300 rpm | 97 |
| 200 rpm | 74 |
| 100 rpm | 48 |
| 6 rpm | 12 |
| 3 rpm | 10 |
| 10″ Gel | 13 |
| 10′ Gel | 33 |
| ES (v) | 551 |

The examples described herein demonstrate the efficacy of a seal in a water-based environment. The seal would be even more effective in an oil-based environment.

Advantageously, embodiments of the present disclosure may provide for squeeze packages for managing scale formation downhole. A squeeze package in this context refers to a volume of treatment fluid to be squeezed into a selected reservoir zone. While the present disclosure has been described with respect to a limited number of embodiments, other embodiments can be devised which do not depart from the scope of the present disclosure as disclosed herein. For example the process can be used to seal a variety of any permeable zones not just perforations.

The invention claimed is:

1. A method comprising at least the step of squeezing a treatment fluid into a selected reservoir zone at a downhole injection pressure of at least 50 psi (345 kPa) more than the pressure of the selected reservoir zone, to provide a permanent damage to at least a part of a hydrocarbon-producing zone of the selected reservoir, wherein the permanent damage is effective for at least 30 days,
wherein the step of squeezing the treatment fluid into the selected reservoir zone reduces the permeability of the selected reservoir zone to less than 0.2 millidarcies,
the treatment fluid comprising:
a viscosifying agent;
a fluid loss control agent,
wherein the fluid loss control agent has a softening point of at least 250° F. (121° C.); and
a particulate material comprising at least one or more of calcium carbonate, dolomite, siderite, barite, ultra fine barite, celestite, iron oxides, manganese oxides, ulexlte, carnalite, and sodium chloride,
wherein the particulate material has a d50 mass median diameter of less than 30 microns.

2. The method as claimed in claim 1, wherein the selected reservoir zone is lined with one of: a casing having perforations and a screen having holes; and wherein the squeezing step treats said selected reservoir zone such that some of the perforations and holes are at least partially sealed.

3. The method as claimed in claim 1, wherein the selected reservoir zone has produced hydrocarbons for a period of time, being at least one month, before the step of squeezing the treatment fluid into the selected reservoir zone is performed.

4. The method as claimed in claim 1, wherein the viscosifying agent comprises an organophilic clay.

5. The method as claimed in claim 1, wherein the viscosifying agent comprises at least one of bentonite, montmorillonite, hectorite, attapulgite, illite, fullers earth, beidillite, saponite, vermiculite, zeolites and combinations thereof.

6. The method as claimed in claim 1, wherein the fluid loss control agent has a softening point of at least 500° F. (260° C.).

7. The method as claimed in claim 1, wherein the fluid loss control agent is selected from the group consisting of modified lignites, asphaltic compounds, asphaltites, organophilic humates, and combinations thereof.

8. The method as claimed in claim 1, wherein the fluid loss control agent is at least one of air-blown asphalt and sodium sulfonate asphalt.

9. The method as claimed in claim 1, wherein the particulate material has a particle size distribution of less than one-half of the average pore size of a reservoir matrix of the selected reservoir zone.

10. The method as claimed in claim 1, wherein the treatment fluid further comprises an oleaginous fluid.

11. The method as claimed in claim 1, further comprising the step of perforating a formation prior to performing the step of squeezing the treatment fluid into the selected reservoir zone.

12. The method as claimed in claim 1, further comprising the step of producing from a separate reservoir zone after the step of squeezing the treatment fluid into the selected reservoir zone.

13. The method of claim 1, wherein squeezing the treatment fluid into the selected reservoir zone occurs at a downhole injection pressure of at least 500 psi (3450 kPa) more than the pressure of the selected reservoir zone.

14. A method comprising at least the step of squeezing a treatment fluid into the selected reservoir zone to provide a permanent damage to at least a part of a hydrocarbon-producing zone of the selected reservoir, wherein the permanent damage is effective for at least 30 days,
wherein the step of squeezing the treatment fluid into the selected reservoir zone reduces the permeability of the selected reservoir zone to less than 0.2 millidarcies,
the treatment fluid consisting essentially of:
a base fluid;
a viscosifying agent;
a fluid loss control agent having a softening point of at least 500° F. (260° C.); and
a particulate material;
wherein the particulate material comprises at least one or more of calcium carbonate, dolomite, siderite, barite, ultra fine barite, celestite, iron oxides, manganese oxides, ulexlte, carnalite, and sodium chloride, and
wherein the particulate material has a d50 mass median diameter of less than 30 microns.

15. The method of claim 14, wherein the base fluid is an invert emulsion of an oleaginous continuous phase and a non-oleaginous discontinuous phase emulsified in the oleaginous continuous phase by at least one emulsifier.

16. A method comprising at least the step of squeezing a treatment fluid into the selected reservoir zone to provide a permanent damage to at least a part of a hydrocarbon-producing zone of the selected reservoir, wherein the permanent damage is effective for at least 30 days,
wherein the step of squeezing the treatment fluid into the selected reservoir zone reduces the permeability of the selected reservoir zone to less than 0.2 millidarcies,
the treatment fluid comprising:
a viscosifying agent;
a fluid loss control agent having a softening point of at least 270° F. and present in the treatment fluid in an amount greater than 25 kg/m$^3$; and
a particulate material;

wherein the particulate material comprises at least one or more of calcium carbonate, dolomite, siderite, barite, ultra fine barite, celestite, iron oxides, manganese oxides, ulexite, carnalite, and sodium chloride, and
wherein the particulate material has a d50 mass median diameter of less than 30 microns.

* * * * *